United States Patent
Walter et al.

(10) Patent No.: US 8,656,414 B1
(45) Date of Patent: Feb. 18, 2014

(54) FUNCTION EXECUTION FRAMEWORK DESCRIBE FUNCTIONALITY

(75) Inventors: Wolfgang Walter, Heidelberg (DE); Andre Klahre, Schwetzingen (DE)

(73) Assignee: SAP AG, Walldorf (DE)

( * ) Notice: Subject to any disclaimer, the term of this patent is extended or adjusted under 35 U.S.C. 154(b) by 32 days.

(21) Appl. No.: 13/559,178

(22) Filed: Jul. 26, 2012

(51) Int. Cl.
*G06F 13/00* (2006.01)

(52) U.S. Cl.
USPC .......................................................... 719/320

(58) Field of Classification Search
USPC .......................................................... 719/320
See application file for complete search history.

(56) References Cited

U.S. PATENT DOCUMENTS

| | | | |
|---|---|---|---|
| 6,263,485 B1 | 7/2001 | Schofield | |
| 7,315,980 B2 | 1/2008 | Anderson et al. | |
| 8,209,657 B1 * | 6/2012 | Sawyer et al. | 717/100 |
| 2009/0183144 A1 | 7/2009 | Aupperle et al. | |
| 2011/0246967 A1 * | 10/2011 | Garavaglia, Jr. | 717/124 |

OTHER PUBLICATIONS

Wikibooks, "More C++ Idioms/Capability Query," 3 pages (accessed Jul. 9, 2012).
Wikipedia, "Object-oriented programming" 11 pages (accessed Jul. 16, 2012).

* cited by examiner

*Primary Examiner* — Andy Ho
(74) *Attorney, Agent, or Firm* — Klarquist Sparkman, LLP

(57) ABSTRACT

A framework can provide describe definitions for use cases. The framework can comprise a controller layer, a wrapper layer, and a function layer. The controller layer can be configured to receive describe requests and return describe results. The wrapper layer can be configured to call describe methods of functions that implement the use cases. The function layer can comprise functions that implement the use cases. A function execution request can be received, a customized function execution sequence can be determined for the function execution request, the customized function execution sequence can be executed, and results of the execution can be returned. The customized function execution sequence can comprise an indication of execution order for a plurality of functions.

20 Claims, 8 Drawing Sheets

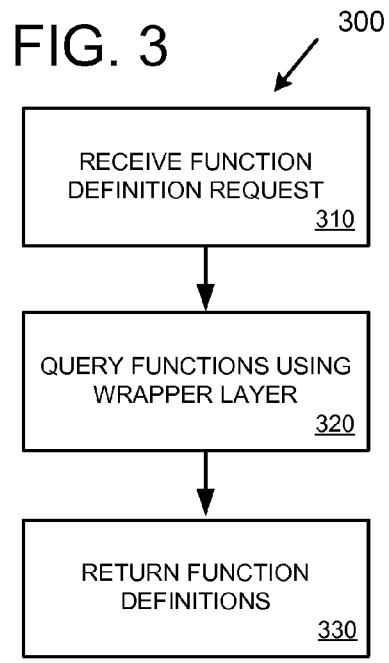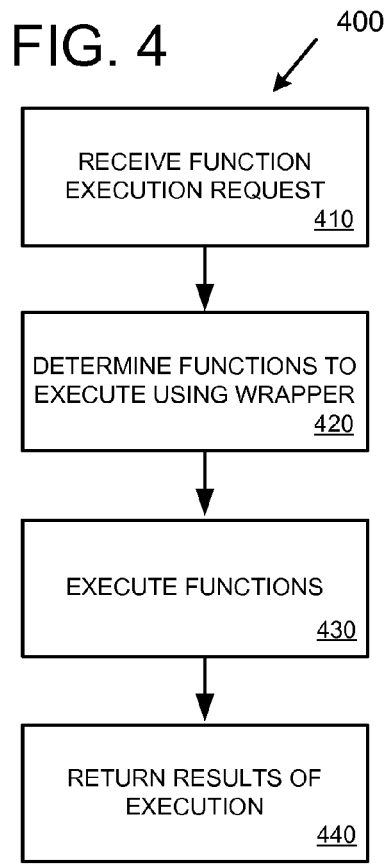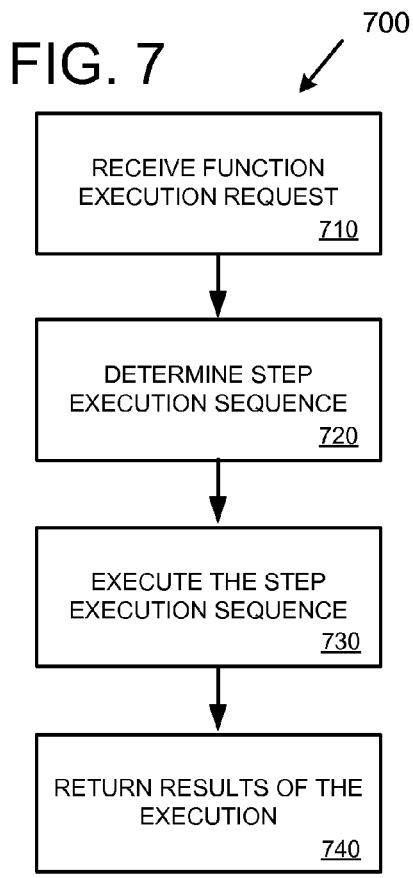

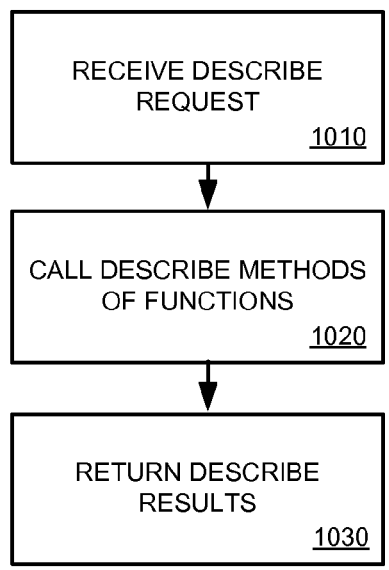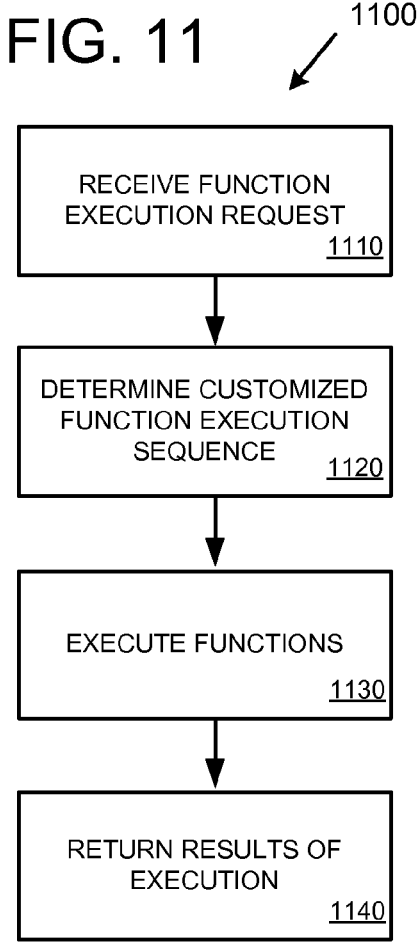
FIG. 10
FIG. 11

FUNCTION EXECUTION FRAMEWORK DESCRIBE FUNCTIONALITY

BACKGROUND

Software packages, such as complex software systems, provide a wide variety of functionality for use by their customers. Sometimes, a software package may provide all of the functionality that a user needs to accomplish a specific task. However, in the case of large or complex software systems, such as enterprise resource planning (ERP) systems, the customer often needs to customize the software system to meet the customer's needs.

In order to customize a large or complex software system, a user may have to create a new extension that operates independently of the software system. The new extension may include custom programming related to custom user interfaces, custom data access procedures, custom data processing routines, and other types of custom programming. The new extension may be difficult to integrate into the software system. For example, custom interface programming may be required to transfer data between the new extension and the software system.

While some large or complex software systems may provide facilities for creating new extensions within the software system, custom programming may still be required to integrate the new extensions into the software system. In addition, the software system may not provide the ability to extend existing functions of the software system.

Therefore, there exists ample opportunity for improvement in technologies related to extending functionality of software systems.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

For example, a framework (e.g., a function execution framework) can be provided for providing describe definitions for use cases of the framework. The framework comprises a controller layer, a wrapper layer, and a function layer. The controller layer can be configured to receive describe requests from software components to describe a use case implemented by the framework and return describe results to the software components. The wrapper layer can be configured to call describe methods of one or more functions implementing the use case and return describe results for the one or more functions. The function layer can comprise the one or more functions.

As another example, a method can be provided for providing describe definitions for use cases of a function execution framework. The method comprises receiving (e.g., from a software component) a describe request to describe a use case implemented by the framework, calling describe methods of one or more functions, where the one or more functions implement the use case, and returning describe results from the one or more functions returned from the calling of the describe methods.

As another example, a method can be provided for providing function execution services using a function execution framework. The method comprises receiving a function execution request from a software component, determining a customized function execution sequence for the function execution request, executing the customized function execution sequence, and returning results of the execution of the customized function execution sequence. The customized function execution sequence can comprise an indication of execution order for a plurality of functions.

As described herein, a variety of other features and advantages can be incorporated into the technologies as desired.

BRIEF DESCRIPTION OF THE DRAWINGS

FIG. 3 is a flowchart of an example method for providing function execution services.

FIG. 4 is a flowchart of an example method for providing function execution services using a wrapper.

FIG. 7 is a flowchart of an example method for executing a step execution sequence.

FIG. 10 is a flowchart of an example method for providing describe definitions for use cases.

FIG. 11 is a flowchart of an example method for executing a customized function execution sequence.

DETAILED DESCRIPTION

Example 1

Exemplary Overview

Figure 1:
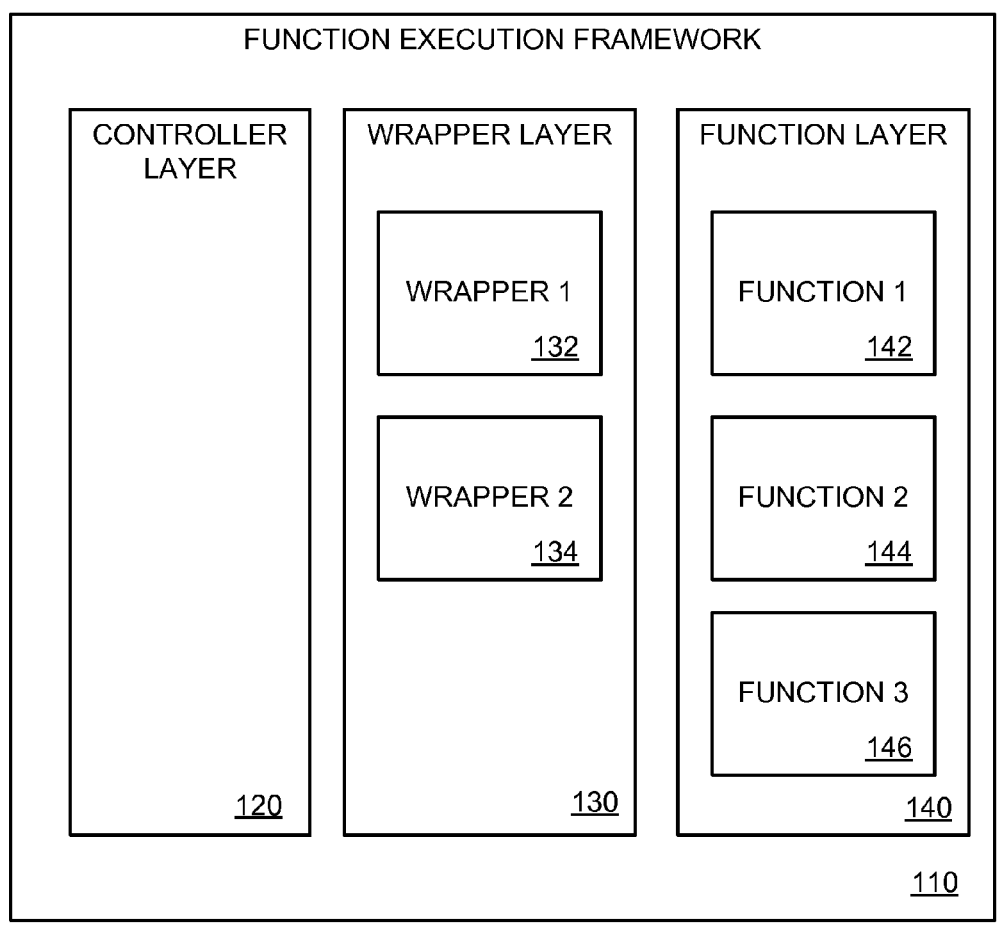
FIG. 1 is a diagram depicting an example function execution framework.

The following description is directed to techniques and solutions for providing a framework (e.g., a function execution framework or function execution shell) for providing function execution services. For example, the function execution framework can comprise a controller layer, a wrapper layer, and a function layer. The function execution framework can also comprise different or additional layers.

The framework can provide functionality to consumers. Consumers refer to software components (e.g., applications, modules, software systems, processes, and the like) that use the framework to execute functions. For example, a consumer can be a user interface (e.g., a graphical user interface (GUI) that displays user interface elements, such as input fields, buttons, display tables, and other types of elements for user input and/or display), a software module (e.g., a software module of the same software system as the framework or a software module of another system), or another type of software component.

The framework can provide information to consumers (software components) describing functions provided by the framework. For example, the framework can receive function definition requests and provide function definition results in return. The function definition results can describe one or more functions and/or use cases provided by the framework that can be called (e.g., executed) by the consumers. For example, the function definition requests and results can provide definitions of the functions (e.g., all the functions) of a particular use case. Function definition information can be obtained by querying describe methods of wrappers, use cases, functions, and/or features. Function definition information can also be obtained by querying describe methods of the controller layer (e.g., which can provide aggregated function definition results for all use cases provided by the framework).

The framework can also execute functions for consumers. For example, the framework can receive function execution requests and provide function execution results from execution of one or more functions.

The framework can provide function execution services in the context of use cases. Use cases refer to collections of related functionality. For example, a particular use case can comprise functionality for performing a specific task or activity. An example use case is a search use case. A search use case can comprise functionality for performing various types of searches. A use case can consist of one or more functions. For example, a search use case can consist of a number of functions for implementing various search strategies (e.g., searching based on material number, searching based on Global Trade Identification Number (GTIN), etc.).

The framework can provide functions (e.g., included or built-in functions). For example, a framework can be provided by a software manufacturer with a number of use cases and associated functions. A user of the framework (e.g., an end-user customer of the software manufacturer, a consultant, a programmer, or another type of user) can extend the framework. For example, the user can create custom functions to extend existing use cases (e.g., use cases that have been provided by the software manufacturer). The user can also create custom use cases with associated functions.

Existing use cases and/or functions can be extended. For example, a user can create a new function to extend an existing use case. The user can implement a function definition method for the new function to provide information regarding the new function to the framework and to consumers of the new function. The user can also implement a function execution method for the new function to allow the new function to be executed (e.g., by the framework or by consumers of the function).

The framework can provide customized execution of functions. For example, the framework can support various types of steps, including a setup step, an execute step, and a finalize steps. The framework can determine which steps are supported or used by use cases and/or functions. For example, a specific function may only use one or two of the steps (e.g., only an execute step), and multiple instances of a particular step may be used (e.g., a function may support one or more instances of the execute step). For example, the framework can receive an execution request from an external software component (e.g., a user interface component) and determine that the function execution request is for a specific use case and associated function. The framework can then determine which steps the specific use case and associated function use, determine a step execution sequence (e.g., one execute step and one finalize step), execute the step execution sequence by calling the specific use case and associated function, and return results to the external software component.

The framework can also provide customized function execution sequences. For example, a customized function execution sequence can define the order of execution of a plurality of functions (e.g., execute function 1, then function 3, then function 2). The customized function execution sequence can also define the specific functions that are executed for a specific use case. For example, a use case provided by a software manufacturer may include three functions (function 1, function 2, and function 3). A customer may extend the use case by creating function 4. The customer can define that function 4 should be executed at a specific location in the order (e.g., an order of execution of function 1, function 4, function 2, and function 3).

Example 2

Exemplary Framework

In any of the examples herein, a framework (e.g., a function execution framework) can provide function execution services (e.g., to consumers of the framework). For example, the framework can provide function definition information, support use cases, execute functions (e.g., in various orders and using various steps), and provide results of the execution.

FIG. 1 is a diagram depicting an example function execution framework 110. The function execution framework comprises a controller layer 120, a wrapper layer 130, and a function layer 140.

The controller layer 120 provides a generic interface to the function execution framework 110. For example, the controller layer 120 can expose untyped interfaces (e.g., using untyped parameters) for use by consumers of the framework 110. The controller layer 120 can receive requests from consumers (e.g., software components) to determine function definitions and to execute functions. The controller layer 120 can provide results to consumers in response to definition and execution requests. The controller layer 120 can also provide data validation services, including performing validation of input parameters and ensuring that calls are correct. The controller layer 120 can also perform implicit filtering of functionality (e.g., filter functionality that is not provided by a current operating system, such as functionality that runs only on a specific type of database).

The controller layer 120 can control execution of functions (e.g., as a customized function execution sequence) and/or steps (e.g., as a step execution sequence). For example, the controller layer 120 can control performance of different types of steps for a function execution request, including setup steps, execute steps, and finalize steps. The controller layer 120 can determine which steps are support or used by use cases and/or functions of framework 110.

The wrapper layer 130 provides an interface from the generic controller layer 120 to implementation-specific functionality provided by the framework 110. For example, the wrapper layer 130 can provide implementations for specific use cases and/or specific functions (e.g., functions associated with use cases). The wrapper layer 130 can determine the various use cases, and their associated functions, provided by the framework 110, filter and merge functionality provided by the functions, control which functions are executed and in which order, provide intermediate results (e.g., for use between functions), relay requests for function definition information (e.g., between the controller layer 120 and the function layer 140), and provide other functionality regarding implementation of the use cases and functions.

In the framework 110, the wrapper layer 130 includes two wrappers, wrapper 1 (132) and wrapper 2 (134). In a specific implementation, each wrapper is associated with a specific use case. For example, wrapper 1 (132) can be associated with a first use case (e.g., a search use case) and wrapper 2 (134) can be associated with a second use case (e.g., a quality validation use case). Depending on implementation details, any number of wrappers may be supported by the wrapper layer 130.

The function layer 140 contains the functionality that is implemented by the framework 110 (e.g., functionality for the use cases provided by the framework 110). The function layer 140 comprises functions (e.g., software code, classes, methods, and the like). For example, the function layer 140 depicted in FIG. 1 comprises three functions, function 1 (142), function 2 (144), and function 3 (146). Each function can be associated with one or more use cases. For example, wrapper 1 (132) (e.g., implementing a search use case) can be associated with function 1 (142) and function 2 (144). Wrapper 2 (134) (e.g., implementing a quality validation use case) can be associated with function 3 (146). Depending on implementation details, the same function could be used in multiple use cases. For example, function 2 (144) could be used by wrapper 1 (132) and by wrapper 2 (134). Depending on implementation details, any number of functions may be supported by the function layer 140.

The functions (e.g., 142, 144, and 146) of the function layer 140 can comprise features. A feature refers to a unit of functionality provided by a function. For example, a function can be a function for searching for materials. The search for materials function can include two features, a first feature for searching by material number and a second feature for searching by material description.

The framework 110 can be extended. For example, the framework 110 can be provided by a software manufacturer (e.g., as part of a software system, such as a supply chain management software system). The framework 110 can include the controller layer 120, the wrapper layer 130 (e.g., including a number of wrapper implementations and associated use cases and functions provided by the software manufacturer), and the function layer 140. A customer of the software manufacturer can extend the framework 110. For example, the customer can create new functions within the function layer 140 (e.g., new functions to extend functionality of existing use cases). The customer can also create new wrappers within the wrapper layer 130 (e.g., to support a new or modified use case) and corresponding functions within the function layer 140 to implement the use case of the new wrapper.

Example 3

Exemplary Use Cases

In any of the examples herein, function execution services can be provided using use cases. Use cases refer to collections of related functionality. For example, a particular use case can comprise functionality for performing a specific task or activity. Examples of use cases include a search use case, a quality validation use case, and a sales data analysis use case.

Figure 2:
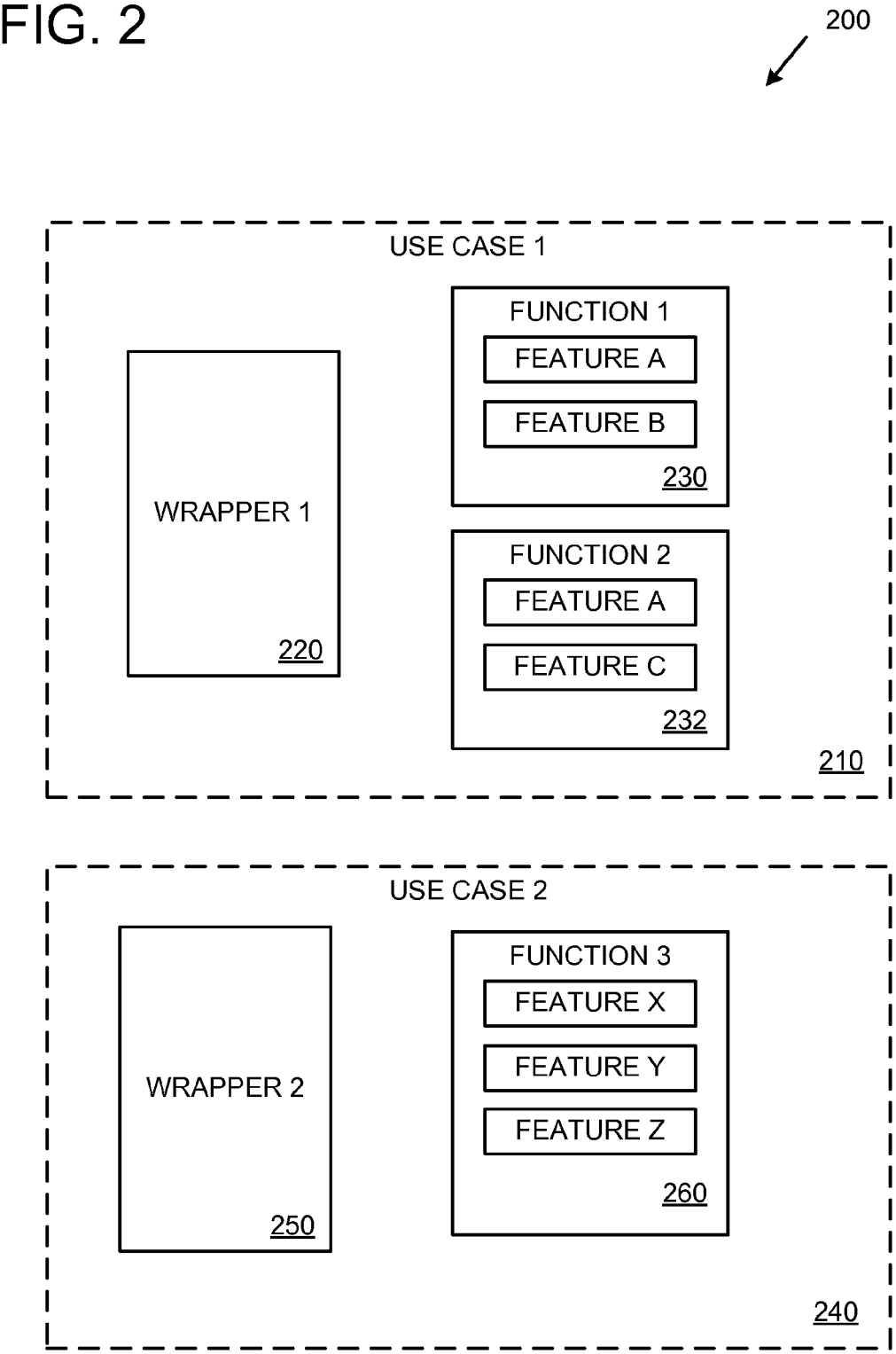
FIG. 2 is a diagram depicting example use case implementations.

FIG. 2 is a diagram depicting example use case implementations 200. For example, the use cases 200 can be implemented within the framework 110 depicted in FIG. 1.

The example use case implementations include a first use case 210. The first use case 210 is associated with wrapper 1 (220). In some implementations, each use case is implemented using one wrapper. The first use case 210 includes two functions, function 1 (230) and function 2 (232). Function 1 (230) includes two features, feature A and feature B. Function 2 (232) includes two features, feature A and feature C.

As an example, the first use case 210 can be a search use case, with function 1 (230) being a search for material function and function 2 (232) also being a search for material function. Feature A (which is included in both function 1 (230) and function 2 (232)) can be a search by material number feature (e.g., a feature which defines search using a material number field, numeric data input of 10 digits, and an 'equals to' operator). Feature B can be a search by material description feature (e.g., a feature which defines search using a description field, text data input of 25 characters, and an 'includes' operator). Feature C can be a search by GTIN (e.g., a feature which defines search using a global trade identifier field, numeric data input of 12 digits, and an 'equals to' operator).

Function 1 (230) and function 2 (232) of the first use case 210 can be used separately. For example, a consumer of a framework that implements the first use case 210 can execute (via the wrapper 220) function 1 (230) to provide a search user interface for searching for materials that includes a field for entering a material number and a field for entering a material description. When the search is executed, the wrapper 220 can receive input data (e.g., the entered material number and description) and execute the search via function 1 (230) (and features A and B). Results can be returned by the wrapper 220 (e.g., results including a table of results listing matching materials that match the input material number and description).

Function 1 (230) and function 2 (232) of the first use case 210 can also be used together. For example, a consumer of a framework that implements the first use case 210 can execute (via the wrapper 220) features A and B of function 1 (230) along with feature C of function 2 (232) to provide a search user interface for searching for materials that includes a field for entering a material number, a field for entering a material description, and a field for entering a GTIN. Alternatively, feature A of function 2 (232) can be used, as both function 1 (230) and function 2 (232) include feature A. When the search is executed, the wrapper 220 can receive input data (e.g., the entered material number, description, and GTIN) and execute the search via functions 1 (230) (and features A and B) and 2 (232) (and feature C). Results can be returned by the wrapper 220 (e.g., results including a table of results listing matching materials that match the input material number, description, and GTIN.

The example use case implementations include a second use case 240. The second use case 240 is associated with wrapper 2 (250). The second use case 240 includes one function, function 3 (260). Function 3 (260) includes three features, feature X, feature Y, and feature Z.

As an example, the second use case 240 can be a quality validation use case, with function 3 (260) being a quality validation function for validating the quality of imported data. Features X, Y, and Z can be features that each calculate a different key performance indicator (KPI) for data to be imported. The KPIs can be returned to a consumer (e.g., as intermediate results) and a decision can be made whether to proceed with the import.

The use cases 200 can provide information describing their capabilities (e.g., function definitions or describe definitions). For example, wrapper 220 can receive a request to describe its functionality. Wrapper 220 can call methods of its functions (e.g., describe methods of 230 and 232) and return results. Wrapper 220 can aggregate functionality of its functions. For example, wrapper 220 can provide results describing aggregate functionality of function 1 (230) and function 2 (232) (e.g., aggregate functionality comprising feature A, feature B, and feature C) to a consumer for use by the consumer separately or in combination.

Use cases can be used in combination (e.g., stacked). For example, functions 1 (230) of use case 1 (210) could call use case 2 (240) or call specific functions and/or features provided by use case 2 (240).

Use cases can be distributed. For example, a central system can provide a number of functions that call use cases provided by remote systems (e.g., a number of remote systems, each operating a separate database).

Example 4

Exemplary Methods for Providing Function Execution Services

FIG. 3 is a flowchart of an exemplary method 300 for providing function execution services. The method can be implemented, for example, by a function execution framework, such as the framework 110 depicted in FIG. 1. At 310, a function definition request is received. For example, the function definition request can be received by a function execution framework from a software component.

At 320, a plurality of functions are queried by a wrapper layer to determine function definitions for the plurality of functions. The function definitions indicate the functionality (e.g., capabilities) provided by the plurality of functions. For example, the function definitions can indicate input parameters supported by the functions, user interface elements to be displayed, type of results returned, operating environment supported (e.g., whether a function is available for use with a particular database), etc. In some implementations, the function definitions include attributes used by the functions, operators used by the functions, and data types used by the functions. At 330, the function definitions are returned. For example, the function definitions can be returned to a software component.

The wrapper layer can comprise one or more wrappers. Each wrapper can be associated with a particular use case. For example, a wrapper can receive a function definition request (e.g., from a software component by way of a controller layer). The wrapper can query functions associated with the wrapper (e.g., functions that implement the use case associated with the wrapper) to obtain function definitions of the functions. The wrapper can return the function definitions (e.g., to the software component by way of the controller layer). The wrapper can also receive function execution requests, send the function execution requests to functions of the wrapper, and return results of execution.

FIG. 4 is a flowchart of an exemplary method 400 for providing function execution services using a wrapper. The method can be implemented, for example, by a function execution framework, such as the framework 110 depicted in FIG. 1. At 410, a function execution request is received. For example, the function execution request can be received by a function execution framework from a software component.

At 420, the wrapper determines one or more functions to execute for the function execution request. For example, the wrapper can be associated with a particular use case and the one or more functions can implement the use case. The wrapper can determine which of the functions that implement the use case need to be executed. Depending on the function execution request, all of the functions that implement the use case may need to be executed, or only some of the functions that implement the use case may need to be executed.

At 430, the one or more functions determined by the wrapper 420 are executed. At 440, results of the execution of the one or more functions are returned. For example, the results can be returned to the software component.

Example 5

Exemplary Step Execution Sequences

In any of the examples herein, execution of a use case and/or function can be divided into one or more steps. For example, a framework (e.g., a function execution framework) can support at least three types of steps for executing the use case and/or function: a setup step, an execute step, and a finalize step. Depending on implementation details of the particular function and/or use case, one or more of the steps may be used (and others may be unused or optional steps). Furthermore, some steps may be repeated multiple times.

The setup step can be configured to receive data for a function execution request. For example, the received data can be provided to a wrapper of the wrapper layer for use during execution. The execute step can be configured to execute a use case (e.g., including one or more associated functions or features). For example, the data received during the setup step can be used during the execute step. The finalize step can be configured to return results. For example, results of one or more execute steps can be returned.

Figure 5:
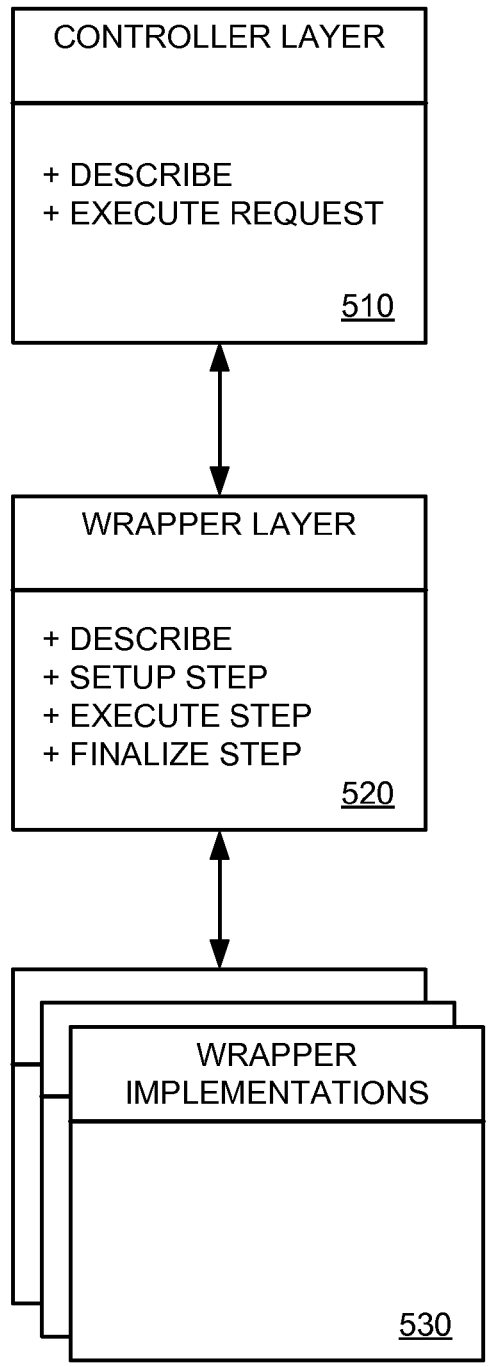
FIG. 5 is a diagram depicting example operations supported by a function execution framework.

FIG. 5 is a diagram depicting operations (e.g., programming methods) supported by a function execution framework. As depicted in the diagram, the controller layer 510 supports at least a describe operation and an execute operation (e.g., a describe method and an execute method). The describe operation can be called, for example, by a software component to determine the functionality available. For example, the describe operation can be used to determine the functionality available for a specific use cases. The execute operation can be called, for example, by a software component to execute one or more use cases and/or one or more functions (e.g., one or more functions associated with a specific use case).

The wrapper layer 520 supports at least the describe operation and at least the three types of steps (setup, execute, and finalize). The wrapper implementations 530 implement the use cases and/or functions provided by the wrapper layer 520. In some implementations, the wrapper layer 520 comprises a separate wrapper for each use case, and the wrapper implementations 530 comprise functions and/or features for each wrapper/use case.

For example, the execute request operation of the controller layer 510 can be called once to execute a use case. The controller layer 510 can determine which functions need to be executed (e.g., and in which order, such as a customized function execution sequence) for the use case (e.g., by querying a wrapper of the wrapper layer 520). The controller layer 510 can determine which steps are used for the use case (e.g., by querying a wrapper of the wrapper layer 520). Depending on the steps used, the controller layer 510 can split the execute request into the steps used and call the wrapper of the wrapper layer 520 to perform the steps, which in turn can call functions and features of the wrapper implementation. For example, the use case may use one setup step and multiple execute steps (and not a finalize step).

Figure 6:
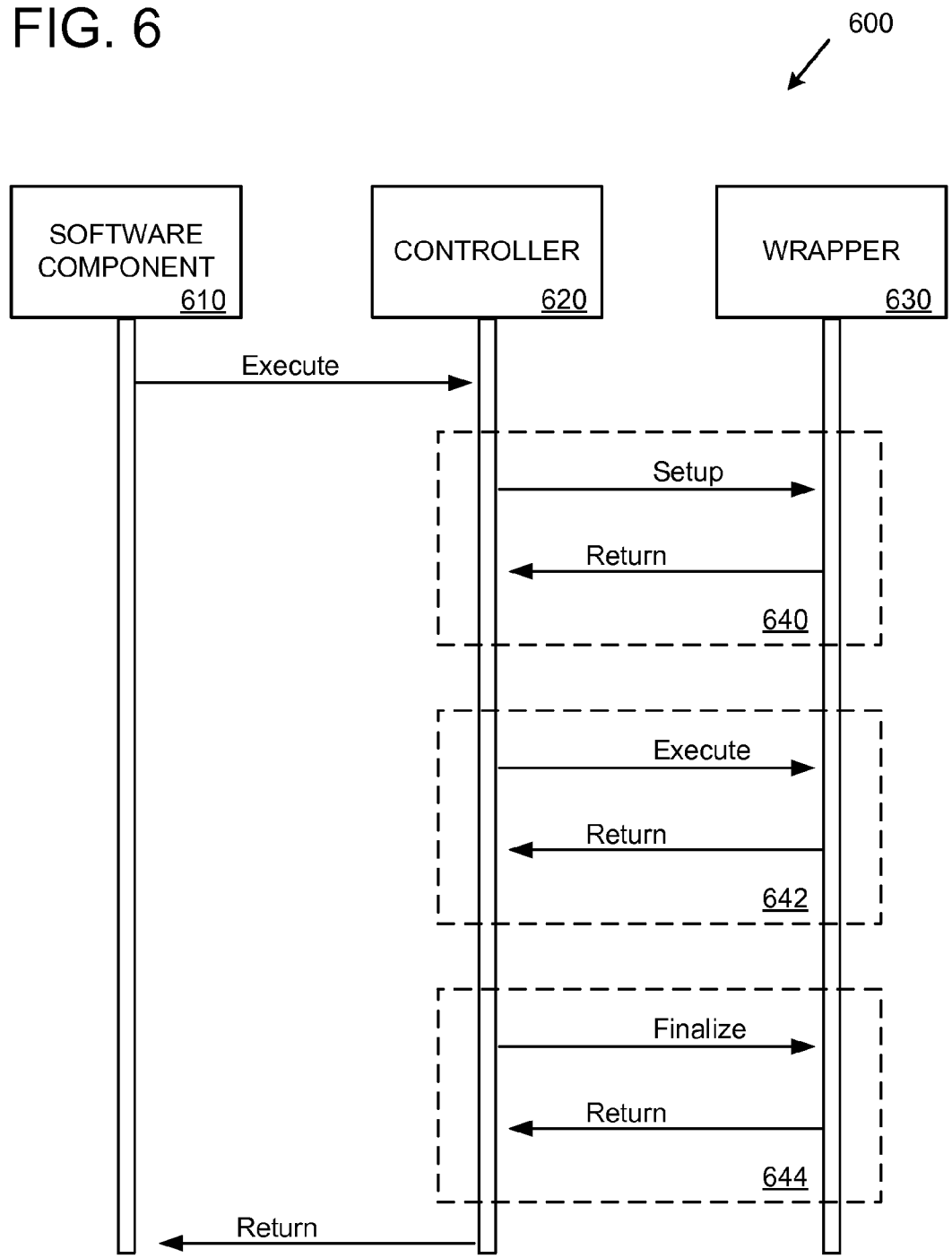
FIG. 6 is a diagram depicting a an example step execution sequence for executing a function execution request.

FIG. 6 is a diagram 600 depicting an example step execution sequence for executing a function execution request. As depicted in the diagram 600, a software component 610 sends an execute request (e.g., a function execution request) to a controller 620 (e.g., a controller layer of a function execution framework). The execute request can be a request to execute a use case and associated functions.

The controller 620 determines which steps to perform in order to complete the execute request. For example, the controller 620 can determine which steps are used by a use case by querying a wrapper 630 that implements the use case. Depending on the steps used, the controller 620 can perform zero or more setup steps 640, zero or more execute steps 642, and zero or more finalize steps 644. Optionally, the controller 620 can return results of the execute request to the software component 610.

FIG. 7 is a flowchart of an exemplary method 700 for executing a step execution sequence. The method can be implemented, for example, by a function execution framework, such as the framework 110 depicted in FIG. 1. At 710, a function execution request is received. For example, the function execution request can be received by a function execution framework from a software component.

At 720, a step execution sequence is determined for executing a function of the function execution request. For example, the step execution sequence can comprise zero or more setup steps, zero or more execute steps, and zero or more finalize steps. The step execution sequence can comprise at least one step.

At 730, the determined step execution sequence is executed. At 740, results of the execution of the step execution sequence are returned (e.g., returned to a software component).

For example, consider a step execution sequence for a key performance indicator (KPI) use case that calculates 50 different KPIs on the same set of data. For this example use case, the step execution sequence may perform one setup step that provides the data set, 50 execute steps that each calculate one of the KPIs using the same data set from the setup step, and one finalize step that returns all 50 KPI results.

Example 6

Exemplary Describe Definitions

In any of the examples herein, frameworks, use cases, functions, and/or features can implement programming methods (e.g., class methods) to describe their functionality. For example, a use case and its associated functions can support a describe method which provides a description of the functionality provided by the use case and associated functions. Results returned from a describe method can include user interface element definitions, attributes (e.g., data field names), types (e.g., data type, numeric type, dollar value, etc.), length (e.g., 10 characters), available options (e.g., between, equal to, greater than, includes, etc.), and any other type of definition information related to input data, output data, and/or data processing.

For example, a framework, such as the framework 110 depicted in FIG. 1, can be used to provide describe definitions for use cases. For example, a controller layer can be configured to receive describe requests from software components to describe a use case implemented by the framework and return describe results. A wrapper layer can be configured to call describe methods of one or more functions implementing the use case and return describe results for the functions. A function layer can comprise the one or more functions. For example, the controller layer can receive an invocation of its describe method for the use case and call the describe method of the wrapper corresponding to the use case. The wrapper, in turn, can call describe methods of the functions that implement the use case, aggregate describe results from the functions, and pass the results back to the controller layer.

Figure 8:
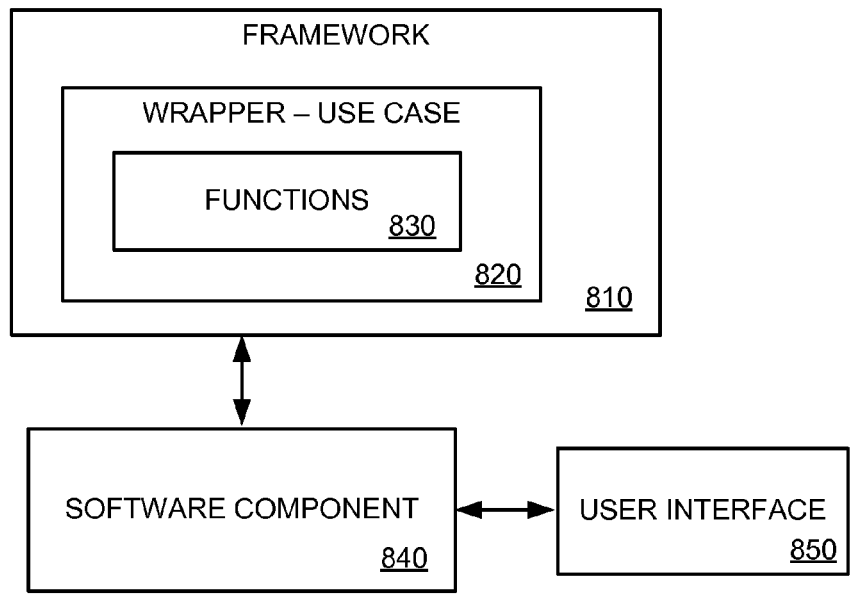
FIG. 8 is a diagram depicting an example framework for providing describe definitions for use cases.

FIG. 8 is a diagram for providing describe definitions for use cases of a function execution framework 810. As depicted in the diagram, a software component 840 is associated with a user interface 850. The software component 840 can send describe requests to the framework 810 for a particular use case. The framework 810 can call a describe method of the wrapper that implements the use case 820, which in turn can call describe methods of the functions 830 that implement the use case. Describe results can be passed back to the software component 840 for use in configuring the user interface 850 based on the describe results (e.g., displaying user interface elements, attributes, and options to allow a user of the user interface 850 to execute the use case). In some implementations, the functions 830 may comprise sub-functionality (e.g., features), which may also implement describe methods.

Figure 9:
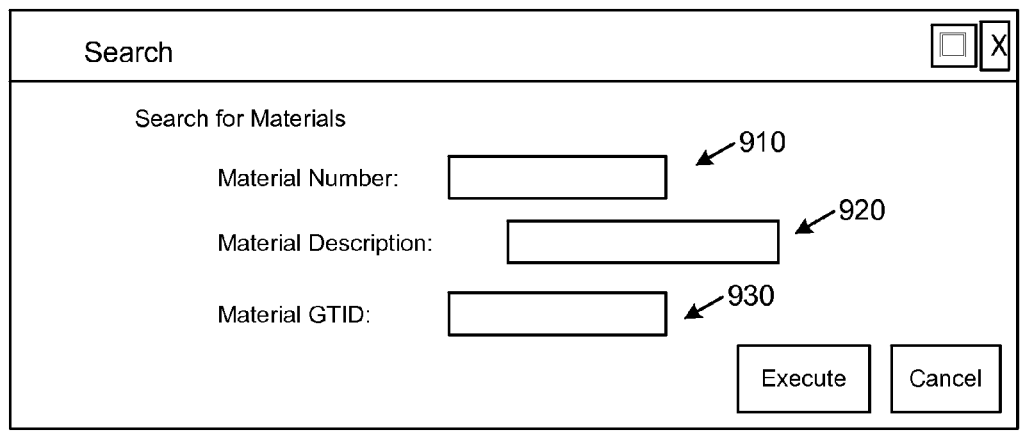
FIG. 9 is a diagram depicting an example user interface for a search use case.

FIG. 9 is a diagram depicting an example user interface 900 for a search use case. The user interface depicts three fields for searching for materials, a material number search field 910, a material description search field 920, and a material Global Trade Identification Number (GTIN) search field 930. The user interface 900 also has an execute button for executing a search request.

For example, the user interface 900 can be generated by a sending a describe request (e.g., via a software component associated with the user interface 900) to a framework to describe a search for materials use case (e.g., corresponding to the use case 210). The user interface 900 (or the software component) can receive describe results describing the three fields 910, 920, and 930. Upon activation of the execute button, the user interface 900 (or the software component) can send an execute request to the framework to execute the use case with the entered information. The user interface 900 (or the software component) can receive results of the execution and display them (e.g., display a table of materials that match the search query).

FIG. 10 is a flowchart of an exemplary method 1000 for providing describe definitions for use cases of a function execution framework. The method can be implemented, for example, by a function execution framework, such as the framework 110 depicted in FIG. 1. At 1010, a describe request is received to describe a use case implemented by the framework. At 1020, describe methods of one or more functions are called, where in the one or more functions implement the use case. For example, a describe method of each function can be called and the results can be aggregated. At 1030, describe results from calling the describe functions are returned.

Example 7

Exemplary Customized Function Execution Sequences

In any of the examples herein, a function execution request (e.g., to execute a particular use case) can involve the execution of a plurality of functions. In some situations, it may be useful to define the order in which the functions are executed. A customized function execution sequence can define which functions are to be executed (e.g., which of a plurality of functions of a use case are to be executed), the sequence in which the functions are to be executed, and other options. For example, the customized function execution sequence can specify which functions can be executed in parallel.

FIG. 11 is a flowchart of an exemplary method 1100 for executing a customized function execution sequence. The method can be implemented, for example, by a function execution framework, such as the framework 110 depicted in FIG. 1. At 1110, a function execution request is received (e.g., from a software component).

At 1120, a customized function execution sequence is determined for the function execution request. For example, the customized function execution sequence can be determined by a wrapper corresponding to a use case. At 1130, the customized function execution sequence is executed. At 1140, results of the execution of the customized function execution sequence are returned (e.g., returned to a software component).

For example, consider a customized function execution sequence for a quality validation use case that evaluates the quality of data to be imported using KPIs. The quality validation use case may calculate a number of KPIs at different stages of importation. For example, a first function that calculates a first KPI may be execute quickly (e.g., relative to other functions that calculate other KPIs) and provide useful results regarding the quality of the data. Therefore, a customized function execution sequence can be created that executes the first function first in the sequence. Intermediate results from executing the first function can be provided and based on the results (e.g., a preliminary indication of the quality of the data to be imported) a decision can be made whether to continue or abort the importation. If the decision is to proceed with the importation, additional functions in the sequence can be executed (e.g., second, third, etc. functions in the sequence).

A customer can create or modify a customized function execution sequence. For example, a function execution sequence can be provided for a particular use case by a software manufacturer along with a function execution framework. The customer may want to add a new function or modify an existing function of the use case. The customer may also want to customize the execution sequence (e.g., place the customer's new or modified function at a specific location in the sequence).

Example 8

Exemplary Computing Systems

Figure 12:
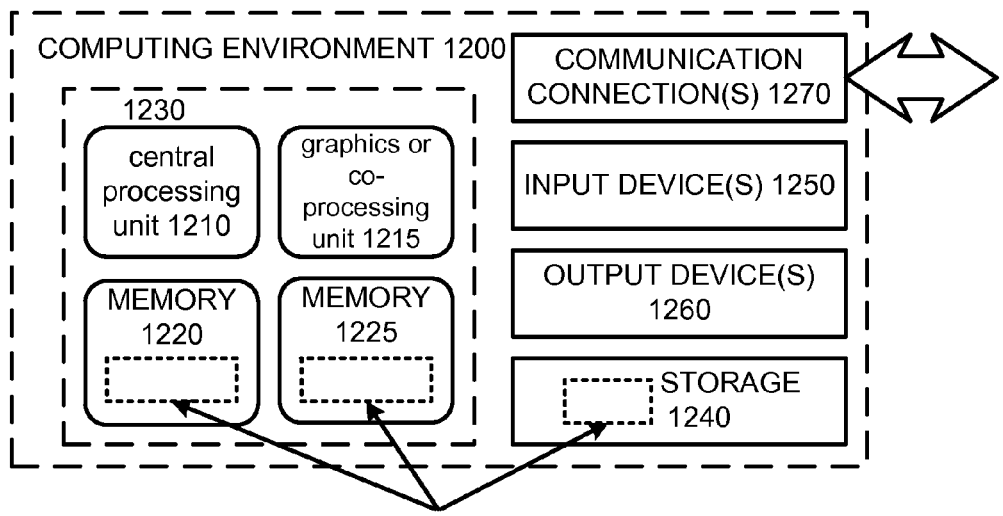
FIG. 12 is a diagram of an example computing system in which some described embodiments can be implemented.

FIG. 12 depicts a generalized example of a suitable computing system 1200 in which the described innovations may be implemented. The computing system 1200 is not intended to suggest any limitation as to scope of use or functionality, as the innovations may be implemented in diverse general-purpose or special-purpose computing systems.

With reference to FIG. 12, the computing system 1200 includes one or more processing units 1210, 1215 and memory 1220, 1225. In FIG. 12, this basic configuration 1230 is included within a dashed line. The processing units 1210, 1215 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 12 shows a central processing unit 1210 as well as a graphics processing unit or co-processing unit 1215. The tangible memory 1220, 1225 may be volatile memory (e.g., registers, cache, RAM), nonvolatile memory (e.g., ROM, EEPROM, flash memory, etc.), or some combination of the two, accessible by the processing unit(s). The memory 1220, 1225 stores software 1280 implementing one or more innovations described herein, in the form of computer-executable instructions suitable for execution by the processing unit(s).

A computing system may have additional features. For example, the computing system 1200 includes storage 1240, one or more input devices 1250, one or more output devices 1260, and one or more communication connections 1270. An interconnection mechanism (not shown) such as a bus, controller, or network interconnects the components of the computing system 1200. Typically, operating system software (not shown) provides an operating environment for other software executing in the computing system 1200, and coordinates activities of the components of the computing system 1200.

The tangible storage 1240 may be removable or non-removable, and includes magnetic disks, magnetic tapes or cassettes, CD-ROMs, DVDs, or any other medium which can be used to store information in a non-transitory way and which can be accessed within the computing system 1200. The storage 1240 stores instructions for the software 1280 implementing one or more innovations described herein.

The input device(s) 1250 may be a touch input device such as a keyboard, mouse, pen, or trackball, a voice input device, a scanning device, or another device that provides input to the computing system 1200. For video encoding, the input device(s) 1250 may be a camera, video card, TV tuner card, or similar device that accepts video input in analog or digital form, or a CD-ROM or CD-RW that reads video samples into the computing system 1200. The output device(s) 1260 may be a display, printer, speaker, CD-writer, or another device that provides output from the computing system 1200.

The communication connection(s) 1270 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 9

Exemplary Cloud Computing Environment

Figure 13:
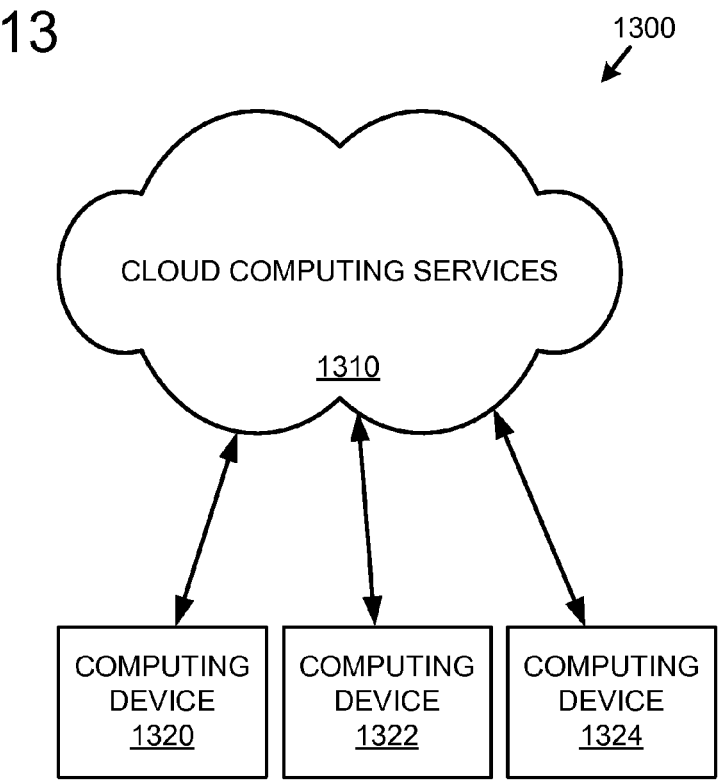
FIG. 13 is an example cloud computing environment that can be used in conjunction with the technologies described herein.

FIG. 13 depicts an example cloud computing environment 1300 in which the described technologies can be implemented. The cloud computing environment 1300 comprises cloud computing services 1310. The cloud computing services 1310 can comprise various types of cloud computing resources, such as computer servers, data storage repositories, networking resources, etc. The cloud computing services 1310 can be centrally located (e.g., provided by a data center of a business or organization) or distributed (e.g., provided by various computing resources located at different locations, such as different data centers and/or located in different cities or countries).

The cloud computing services 1310 are utilized by various types of computing devices (e.g., client computing devices), such as computing devices 1320, 1322, and 1324. For example, the computing devices (e.g., 1320, 1322, and 1324) can be computers (e.g., desktop or laptop computers), mobile devices (e.g., tablet computers or smart phones), or other types of computing devices. For example, the computing devices (e.g., 1320, 1322, and 1324) can utilize the cloud computing services 1310 to perform computing operators (e.g., data processing, data storage, and the like).

Example 10

Exemplary Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (e.g., any available computing device, including smart phones or other mobile devices that include computing hardware). Computer-readable storage media are any available tangible media that can be accessed within a computing environment (e.g., non-transitory computer-readable media, such as one or more optical media discs such as DVD or CD, volatile memory components (such as DRAM or SRAM), or nonvolatile memory components (such as flash memory or hard drives)). By way of example and with reference to FIG. 12, computer-readable storage media include memory 1220 and 1225, and storage 1240. As should be readily understood, the term computer-readable storage media does not include communication connections (e.g., 1270) such as modulated data signals.

Any of the computer-executable instructions for implementing the disclosed techniques as well as any data created and used during implementation of the disclosed embodiments can be stored on one or more computer-readable storage media (e.g., non-transitory computer-readable media). The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the following claims. We therefore claim as our invention all that comes within the scope and spirit of the claims.

We claim:

1. A framework, implemented at least in part by one or more computing devices, for providing describe definitions for use cases of the framework, the framework comprising:

a controller layer, wherein the controller layer is configured to:

receive describe requests from software components to describe a use case implemented by the framework; and return describe results to the software components;

a wrapper layer, wherein the wrapper layer is configured to:

call describe methods of one or more functions implementing the use case; and return describe results for the one or more functions; and a function layer, wherein the function layer comprises the one or more functions.

2. The framework of claim 1 wherein the describe methods of the one or more functions return describe results comprising:
   attributes used by the one or more functions;
   operators used by the one or more functions; and
   data types used by the one or more functions.

3. The framework of claim 1 wherein the describe methods of the one or more functions return describe results comprising:
   one or more user interface fields;
   one or more data types for the one or more user interface fields; and
   one or more options.

4. The framework of claim 1 wherein the function layer comprises a plurality of functions, and wherein calling the describe methods comprises:
   calling a describe method of each function of the plurality of functions to determine a describe definition of the function; and
   aggregating the describe definitions for each function to create the describe results.

5. The framework of claim 1 wherein the wrapper layer comprises a plurality of wrappers, and wherein a wrapper of the plurality of wrappers implements the use case.

6. The framework of claim 1 wherein the software components comprise a user interface and wherein the describe results comprise definitions for one or more user interface elements to be displayed by the user interface.

7. The framework of claim 1 wherein the framework is an extendible framework provided by a software manufacturer, and wherein at least one of the one or more functions is a customized function created by a customer of the software manufacturer as an extension to the extendible framework.

8. A method, implemented at least in part by one or more computing devices, for providing describe definitions for use cases of a function execution framework, the method comprising:
   receiving, from a software component, a describe request to describe a use case implemented by the framework;
   calling describe methods of one or more functions, wherein the one or more functions implement the use case; and
   returning, to the software component, describe results from the one or more functions returned from the calling of the describe methods.

9. The method of claim 8 further comprising:
   aggregating describe results from the one or more functions returned from the calling of the describe methods;
   wherein returning the describe results comprises returning the aggregated describe results.

10. The method of claim 8 wherein the describe methods of the one or more functions return describe results comprising:
   attributes used by the one or more functions;
   operators used by the one or more functions; and
   data types used by the one or more functions.

11. The method of claim 8 wherein the describe methods of the one or more functions return describe results comprising:
   one or more user interface fields;
   one or more data types for the one or more user interface fields; and
   one or more options.

12. The method of claim 8 wherein the describe methods of the one or more functions provide describe results for one or more features of the one or more functions.

13. The method of claim 8 wherein the calling the describe methods is performed by a wrapper of the function execution framework, wherein the wrapper implements the use case.

14. A method, implemented at least in part by one or more computing devices, for providing function execution services using a function execution framework, the method comprising:
   receiving, by the function execution framework, a function execution request from a software component;
   determining, by the function execution framework, a customized function execution sequence for the function execution request;
   executing, by the function execution framework, the customized function execution sequence; and
   returning, by the function execution framework to the software component, results of the execution of the customized function execution sequence;
   wherein the customized function execution sequence comprises:
      an indication of execution order for a plurality of functions.

15. The method of claim 14 wherein the customized function execution sequence is for executing the plurality of functions to implement a use case.

16. The method of claim 14 wherein the customized function execution sequence is determined by a wrapper of the function execution framework.

17. The method of claim 14 wherein at least one function of the plurality of functions is created by a software manufacturer of the function execution framework, and wherein at least one other function of the plurality of functions is created by a customer of the software manufacturer.

18. The method of claim 14 wherein the customized function execution sequence comprises an indication of which functions, of the plurality of functions, are to be executed in parallel.

19. The method of claim 14, further comprising:
   executing at least two functions of the plurality of functions in parallel.

20. The method of claim 14 wherein the wherein the function execution framework is an extendible framework provided by a software manufacturer, and wherein at least one of the plurality of functions is a customized function created by a customer of the software manufacturer as an extension to the extendible framework.

* * * * *